Sept. 12, 1944.   L. EIRICH ET AL   2,357,941
METHOD OF GRANULATING PULVERULENT AND PLASTIC MATERIALS
Filed Feb. 3, 1940   2 Sheets-Sheet 1

INVENTORS:
LUDWIG EIRICH, DEC'D.
BY GUSTAV EIRICH,
LUDWIG EIRICH,
WALBURGA EIRICH,
MARIA HOLLERBACH NEE EIRICH,
ROSA EIRICH,
JOHANNA EIRICH
ANNA EIRICH,
HEIRS AT LAW.
AND JOSEPH EIRICH.

Bailey & Carson
Attorneys

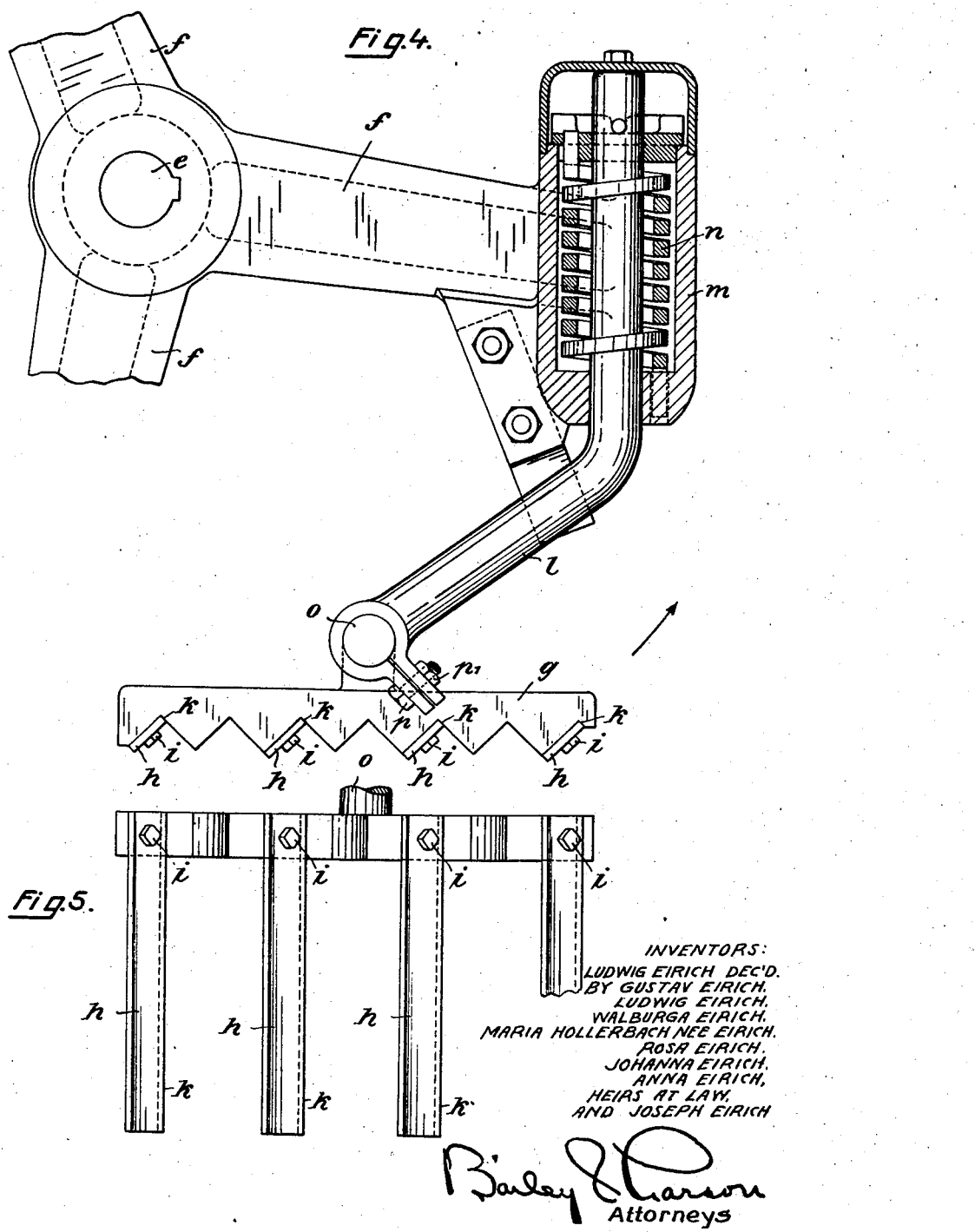

Patented Sept. 12, 1944

2,357,941

UNITED STATES PATENT OFFICE 2,357,941

METHOD OF GRANULATING PULVERULENT AND PLASTIC MATERIALS

Ludwig Eirich, deceased, late of Hardheim, Baden, Germany, by Gustav Eirich, Ludwig Eirich, Walburga Eirich, Maria Hollerbach nee Eirich, Rosa Eirich, Johanna Eirich, and Anna Eirich, heirs at law, Hardheim, Baden, Germany, and Joseph Eirich, Hardheim, Baden, Germany; vested in the Alien Property Custodian Application February 3, 1940, Serial No. 317,206
In Germany September 3, 1934

3 Claims. (Cl. 259—85)

The present invention relates to a process for converting powdery up to fine grained masses into a strewable material consisting of substantially uniform globular granules of a small diameter.

Materials which are in powdery up to fine grained form often possess disadvantageous properties. For example, powdery substances containing a mixture of several materials may tend to separate during transportation or handling. This defect has been found to exist in dry, raw cement mixtures, mixtures for the production of glass, artificial fertilizers, and pharmaceutical preparations. Also, powdery substances often possess a tendency to form lumps which must be broken down again. Also, dusting properties of powdery substances are disadvantageous, especially in the case of powdery mixtures wherein the losses through dusting may alter the composition of the mixtures.

It is an object of the present invention to provide a process whereby powdery up to finely grained materials may be converted into a form which does not exhibit these disadvantages.

By the method according to the invention the powdery or finely grained initial substances are converted into a physical state of a special kind, namely into practically uniform spherical grains. The products according to the invention are free from powdery substances, so that losses by becoming dusty can no longer occur. By the formation of the granulated material in which every single grain, when a mixture is present, contains the individual constituents in the desired proportion and in intimate mixture, separation cannot occur any more. Also caking is impossible as the uniform ball-shaped grains touch each other only at points. The strewing capability and preservation in this condition is thus secured even after long storage.

The conversion of the powdery or finely grained material into a practically uniform spherical and strewable granulated material is effected according to the invention in that the powdery or finely grained initial substances are delivered to an essentially plane support and treated on this support, which is moved revolved relative to the material, with the aid of tools, regulated quantities of a medium in finely distributed form having an agglomerating effect being added during this treatment. The support is preferably a mixing plate or a flat shallow mixing cup which may be rotatable about its centre. In the method according to the invention the manner of the treatment by the tools circulating in long planetary courses is very important. Thin knives, of which several are arranged the one parallel at the side of the other, serve for this purpose. These knives can circulate, about a vertical axle arranged eccentrically to the plate axle, at high speed, while the plate rotates in the opposite direction. If desired, the plate may be stationary, and a planetary movement may be imparted to the tools, for instance by conducting the knife-shaped tools circulating about the vertical axle in a closed path eccentrically to the axle of the mixing plate. The planetary movement of the knives relative to the material to be mixed may be produced, however, in any other manner. By the form, arrangement and manner of operation of the apparatus for the treatment, the material to be treated is continually divided in changing directions into narrow strips and turned over.

As regards the effect and the individual measures essential for the method according to the invention the following is to be said:

A plate, substantially plane, rotating about a vertical axle is of advantage for holding the material to be treated, in order to exclude any disturbances which might result from the force of gravity. The material to be treated must remain at rest during the treatment and carry out only the movements which are imparted to it by the rotating plate and by the treating tools.

The shape of the treating tools as narrow knives is important because caking occurs when a substance is added to the powdery mass which exerts an agglomerating effect, this mass being then cut through and divided only by a thin tool. It is necessary that the tools circulate at high speed in order to attain the desired division even if the masses are dense or become dense during the treatment.

It is of advantage to arrange several knives parallel to one another after the manner of a rake or of a comb in order to obtain a strewable material of small granular shape.

To the knives arranged rake-like a movement is preferably imparted which is directed opposite to the direction of the plate rotation. In this manner curved courses intersecting one another in the most favorable manner and the most rapid effect of grain formation is thus obtained.

The knives may be shaped slightly wedge-like and exert then, upon the material which has just been cut through by the cutting edge, such an effect that this material is thrown over towards both sides.

An oblique position of the knives is admissible in addition to and instead of the wedge-like shape of the same, so that the cutting edge is directed forward, cuts the material during the circulation of the knife, and one of the broad sides exerts then a throwing-over effect.

If the knives work only with their cutting edges, a uniform mixing and division without pressing effect is exerted. For material, agglomerates bind with difficulty, it is advisable to produce a certain pressing effect of the tools by giving to the knives an oblique position relative to the direction of movement. A thick knife exerts also a stronger pressing action than a thin knife.

The thickness of the layer of the charge to be granulated depends on the properties of the mass. Material possessing little sticking force is treated in a comparatively thick layer of about 25 to 50 cm., so that the knives exert a certain pressing effect which is favourable for the compression and for the grain formation. This applies also to material, which to be granulated needs little binding medium and little liquid.

Other materials, for instance compressible porcelain stock, in which the kaolin is moistened with a mixture of water and oil, behave quite differently. The granulated mass must further possess a grainy drizzling character, in order that the dies of the press can be easily and uniformly filled with this material. On the other hand, the mass must contain so much water that, during the pressing proceeding, the material in excess brought into the mould swells over through the overflow slots of the press ram, as otherwise shaped bodies of irregular size are produced. Such a mass well moistened in this manner is very sensitive against pressing, so that the granulating process must be carried out with moderate thickness of layer for instance of about 2 to 3 cm., in order on the one hand to put the required quantity of water into the material and on the other hand to still preserve the fine granulated consistency.

For the production of a medium coarse or very coarse granulation, the material can first be converted into plastic consistency by strong moistening and then, by addition of powderous material within the granulating machine, the degree of moisture can be reduced. In this manner substantially denser granulated bodies are obtained than when powderous material is gradually moistened.

Water, solutions of binding agents, salt solution, oil, tar and sulfite waste liquor may be used as media exerting an agglomerating effect.

If masses are present, which contain water binding substances, for instance masses which have a content of clay, or salts soluble in water or crystal water binding salts, the simplest and easiest agglomerating medium is water. The use of this substance is advisable for the treatment of Portland cement—raw mixtures, for artificial manure, and for glass mixtures.

In other instances it may be advisable, to employ the solution of a binding agent, for instance a solution of waterglass, of lime, dextrine and so forth. In a third instance the use of oil or tar is recommended as binding agent, for instance for the granulation of lime "nitrogen."

As salt solutions which may be employed calcium chloride solution and magnesium chloride solution may be mentioned.

Fundamentally it is further to be stated, that by measuring the quantity of the medium exerting an agglomerating effect and at the same time adjusting the circulating speed of the treating tools it is possible to adjust the size of the granulated material to be produced. If a small grain is desired, high circulation speed of the tools and addition of small quantities of agglomerating substances are to be employed.

If a coarser grain is desired, the circulation speed of the tools must be less and larger quantities of substances have to be added which exert an agglomerating effect.

The method according to the invention may be further explained by the following examples:

The treating apparatus consisted of a circulating mixing plate, above which two knife rakes, each having three knives, circulated about a vertical axle eccentric to the axle of the mixing plate.

5 kg. of superphosphate and 5 kg. of ammonium sulfate ground as usual in commerce were charged on to the plate. The substances were first worked through on the plate during one minute by means of the tools. The revolving speed on the driving shaft amounted to 300 revolutions per minute.

Water was then added with the aid of a spraying nozzle, in all about 0.9 kg. of water within five minutes. During these five minutes the treatment with the circulating knife-tools was continued. The total charge assumed a fine gravelly state.

When lengthening the time of treatment to 6 minutes in all, slightly coarser granules were obtained.

By increasing the water quantity to 1.1 kg. and by lengthening the treating time by 50 seconds more a medium-coarse granulated material was obtained.

In a second experiment the circulation speed of the driving shaft was reduced to 220 revolutions per minute. 15 kgs. of dry cement raw flour was charged upon the plate. 2.7 litres of water were sprayed into the material within five minutes, and the mass at the same time treated by means of the circulating knife-tools. The water supply was then cut off and the material treated again for 2 minutes, resulting in a considerable enlargement of the granules formed.

A control by spraying in 200 grs. water more showed, that the capability of the material to absorb the agglomerating medium was already exhausted. In this instance 1 kg. of dry raw flour was added and the treatment continued for 2 minutes more. Also in this instance a granulated material was formed, which consisted exclusively of uniform grains.

Reduction of the number of revolutions to 150 per minute—measured on the driving shaft—resulted in a gradual increasing of the granulation.

From the description of these experiments it can be seen, that the treatment period is dependent on the time during which the granulated mass absorbs the sprayed-in moistening liquid and devolpes its adhesive force.

Employment of longer treating periods makes it possible generally for the smallest possible quantity of moistening liquid to suffice.

It has finally to be added, that the method according to the invention affords also the possibility, to combine the mixings of several powderous single substances and to transform this mixture into uniform, fine-granulated material. As has been shown in the above first example, a dry mixture had been produced first from the single substances and then, with addition of the agglomerating medium, and in the same apparatus, the dry mixture was transformed into a uniform granulated material.

In the accompanying drawings the arrangement necessary for carrying out the invention is illustrated in several forms of construction.

Fig. 4 shows on larger scale in top plan view and partly in section a special configuration of a treating tool in the arrangement shown in Fig. 1 or 3.

Fig. 5 shows in side elevation the arrangement and configuration of the knife serving for the treatment.

Figure 1:
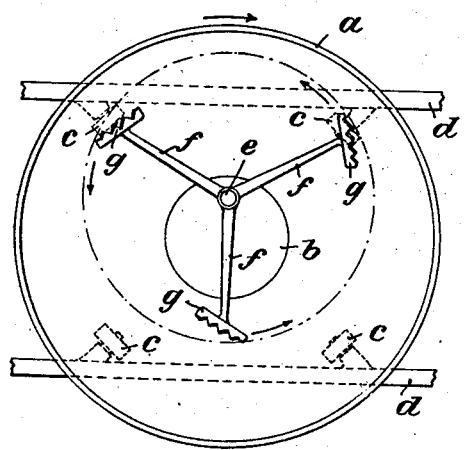
Fig. 1 shows in top plan view an arrangement for carrying out the method according to the invention.
Figure 3:
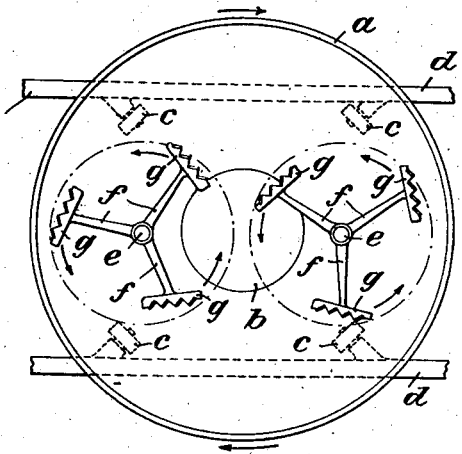
Fig. 3 shows in top plan view another arrangement which is also suitable.
Figure 2:
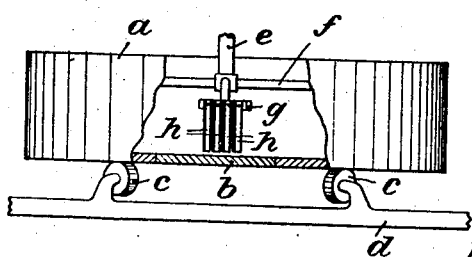
Fig. 2 shows a similar arrangement in side elevation and part section.

In the figures $a$ designates the container, in which the granulating of the material is to take place. This container has an almost plane bottom with a central opening $b$ adapted to be closed by a lid.

The cylindrical container for the treatment is rotatable and rests, with this object in view, on supporting rollers $c$ which are fixed on supports $d$. The driving elements of the contatiner are not shown on the drawing. The drive can be effected in any suitable known manner, for instance by spur wheels.

$e$ designates the axle which is arranged eccentric to the centre of the plate of the container for treatment, and about which axle the treating tools circulate which are fixed on separate supports. Also the drive of the eccentric shaft or of the treating tools is not especially shown in the drawings. The drive can be effected by means of spur wheel transmission, by directly coupled engine, by belt pulleys or the like in a manner known per se.

The tools for the treatment, which are shown in Fig. 5 on an enlarged scale, consist of knives $h$ which, as indicated at $k$, have a sharp cutting edge. These knives are fixed on the supports $g$ by means of screws $i$, the supports in turn being fixed by means of the arms $f$ on the shaft $e$.

According to Fig. 4 the knives are elastic and adjustable. The arm $f$ is connected with a spring casing $m$ in which a torsion spring $n$ is arranged which in turn is connected with the arm $l$. The knife support $g$ can be moved by a hinge $o$ about the arm $l$. Provision has been made so, that these knife supports can be secured in any desired position by means of a screw $p$ and a screw nut $p'$.

Figure 6:
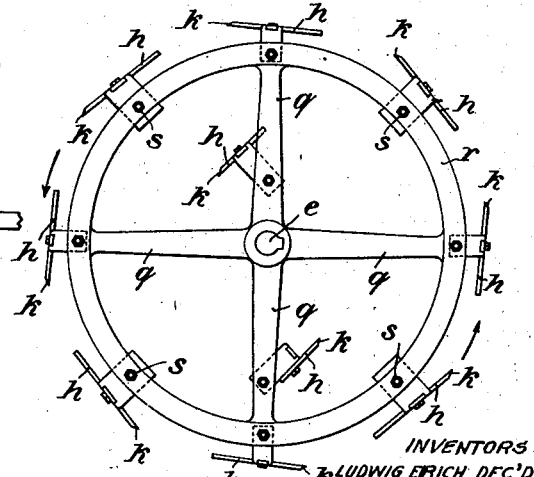
Fig. 6 shows in top plan view another configuration of the treating tools adapted to be used for the method according to the invention.

Fig. 6 shows another construction of the knife supports which is carried out after the manner of a wheel and composed of a ring $r$ connected by an arm $q$ with the eccentric shaft $e$. Knives $h$ with cutting edges $k$ are adjustably connected with the ring $r$ and also with the arms $q$ and can be secured in position by means of screws $s$.

The direction of rotation of the container and of the tools for treatment is indicated by arrows in the Figs. 1, 3, 4 and 6. The position of the knives must in all cases be such, that the cutting edges are forwardly directed in the direction of movement, that is cut, during their circulation, through the material to be treated. A slight inclination of these knives to the direction of movement is admissible, in order to turn over the cut material being treated.

We claim:

1. A method for converting pulverulent to finely grained masses into a strewable material consisting of substantially uniform, spherical grains comprising depositing the masses upon a substantially horizontal support, repeatedly cutting through the masses with thin, flat, spaced elements which are parallelly disposed side by side forming a rake-like element with a planetary movement with respect to the masses to be treated to subdivide said masses into thin strips in continually varying directions and to turn such strips over, and adding regulated quantities of a finely distributed medium exerting an agglomerating effect upon such masses to convert the masses into an agglomerable condition and continuing the cutting treatment with the spaced elements.

2. A method for converting pulverulent to finely grained masses into a strewable material consisting of substantially uniform, spherical grains comprising depositing the masses upon a substantially horizontal plate of a mixing cup rotating about a vertical axis, repeatedly cutting through the masses with thin, flat, spaced elements which are parallelly disposed side by side forming a rake-like element with a rotary movement about a vertical axis eccentric to the axis of the plate and in a direction opposite to the rotation of such plate, to subdivide said masses into thin strips in continually varying directions and to turn such strips over, and adding regulated quantities of a finely distributed medium exerting an agglomerating effect upon such masses to convert the masses into an agglomerable condition and continuing the treatment with the rotary elements.

3. A method for converting pulverulent to finely grained masses into a strewable material consisting of substantially uniform, spherical grains comprising depositing the masses upon a substantially horizontal support, repeatedly cutting through the masses with thin, flat, spaced elements, which are parallelly disposed side by side forming a rake-like element, with a planetary movement with respect to the masses to be treated to subdivide said masses into thin strips in continually varying directions and to turn such strips over, and adding regulated quantities of a finely distributed medium exerting an agglomerating effect upon such masses until an excess of the agglomerating medium has been added and the masses have been converted into a plastic consistency, and then while continuing the treatment with the thin, flat elements adding the pulverulent material in sufficient quantities to produce the desired consistency in the masses for agglomeration.

GUSTAV EIRICH,
LUDWIG EIRICH,
WALBURGA EIRICH,
MARIA HOLLERBACH née EIRICH,
ROSA EIRICH,
JOHANNA EIRICH,
ANNA EIRICH,
Heirs at law of Ludwig Eirich, Deceased,
JOSEPH EIRICH.